(12) United States Patent
Brucker

(10) Patent No.: US 6,183,004 B1
(45) Date of Patent: Feb. 6, 2001

(54) GAS BAG COVERING SYSTEM

(75) Inventor: Roland Brucker, Schwäbisch-Gmünd (DE)

(73) Assignee: TRW Occupant Restraint Systems GmbH & Co. KG, Alfdorf (DE)

( * ) Notice: Under 35 U.S.C. 154(b), the term of this patent shall be extended for 0 days.

(21) Appl. No.: 09/404,069

(22) Filed: Sep. 23, 1999

(30) Foreign Application Priority Data

Sep. 24, 1998 (DE) .......................................... 298 17 161 U

(51) Int. Cl.⁷ .................................................. B60R 21/22
(52) U.S. Cl. ..................................... 280/728.3; 280/730.2
(58) Field of Search ............................. 280/728.3, 728.2, 280/730.2

(56) References Cited

U.S. PATENT DOCUMENTS

| | | | |
|---|---|---|---|
| 5,490,691 | * | 2/1996 | Sinnhuber et al. ................ 280/730.2 |
| 5,755,457 | * | 5/1998 | Specht ................................ 280/728.2 |
| 5,791,683 | * | 8/1998 | Shibata et al. ..................... 280/730.2 |
| 5,921,575 | * | 7/1999 | Kretschmer et al. ............. 280/728.2 |
| 6,082,761 | * | 7/2000 | Kato et al. ......................... 280/730.2 |

* cited by examiner

Primary Examiner—Kenneth R. Rice
(74) Attorney, Agent, or Firm—Tarolli, Sundheim, Covell, Tummino & Szabo L.L.P.

(57) ABSTRACT

A gas bag covering arrangement comprises a gas bag covering for covering an unfolding opening in a vehicle and a device for detachably fastening at least one part of the gas bag covering to the vehicle. The device has at least one holding section and the gas bag covering has a portion which covers the gas bag unfolding opening and which has an edge on which the holding section engages. The device is so flexible that the gas bag covering can move out from its mounting formed by the holding section when the gas bag unfolding opening is exposed. The device further comprises a tear-open section and a mounting section, the tear-open section being destroyed on exposure of the gas bag unfolding opening and on displacement of the holding section such that the flexibility of the device being increased. The holding section remains secured to the device by the mounting section after destruction of the tear-open section.

12 Claims, 2 Drawing Sheets

GAS BAG COVERING SYSTEM

TECHNICAL FIELD

The invention relates to a gas bag covering system having a gas bag covering and a device for detachably fastening at least one portion of the gas bag covering to a vehicle.

BACKGROUND OF THE INVENTION

A gas bag covering system is known from the DE 296 03 316.2. The gas bag covering here represents the lining of the vehicle roof. In the region of the roof frame a profiled mounting clip is fastened to the roof frame itself. This mounting clip has an arm which is hook-shaped in profile and engages the outer edge of the lining. On unfolding of a head/side gas bag which is fastened between the gas bag covering and the roof frame, an outer portion of the gas bag covering folds downwards. For this, the outer edge of the covering springs out from the hook-shaped arm of the mounting clip. Upon opening up of the gas bag covering, the gas bag unfolding opening is exposed, so that the gas bag can extend through it and along the window of the vehicle. On the one hand, the fastening device must fix the lining securely to the vehicle for normal traveling, on the other hand it must not be allowed to offer too great a resistance to the opening of the covering to expose the gas bag unfolding opening. This would in fact impede the unfolding process. In fact at low temperatures, the device, which usually consists of plastic, will however provide for such a high resistance.

BRIEF SUMMARY OF THE INVENTION

The invention provides a gas bag covering system comprising a gas bag covering together with a device for detachable fastening, which makes possible even at low temperatures an easier opening of the gas bag covering, which is formed in particular by lining parts. The gas bag covering system according to the invention comprises a gas bag covering for covering an unfolding opening in a vehicle and a device for detachably fastening at least one portion of the gas bag covering to the vehicle. The device has at least one holding section and the gas bag covering has a portion which covers the gas bag unfolding opening and which has an edge on which the holding section engages. The device is so flexible that the gas bag covering can move out from its mounting formed by the holding section when the gas bag unfolding opening is exposed. The device further comprises a tear-open section and a mounting section, the tear-open section being destroyed on exposure of the gas bag unfolding opening and on displacement of the holding section such that the flexibility of the device being increased. The holding section remains secured to the device by the mounting section after destruction of the tear-open section.

With the covering together with fastening device, according to the invention, the tear-open section in the non-destroyed state increases the holding force of the device. If, however, a threshold force onto the holding section is exceeded on exposure of the gas bag unfolding opening, the tear-open section is destroyed so that only a slight resistance on the part of the device is offered to the complete displacement or swiveling of that portion of the gas bag covering which normally closes the gas bag unfolding opening. So that no flying parts are present, the mounting section is provided which still holds the holding section on the device, even if the tear-open section has moved. The tear-open section preferably lies in the space behind the gas bag covering which is not visible to the vehicle occupant, i.e. is covered, and only the end of the holding section engaging the edge is visible to the occupant.

The tear-open section preferably has a tear-open line which is formed by a material weakening.

According to a development, the holding section is in turn a lip, similar to a sealing lip, running along the edge to be held. The device preferably additionally has a shape like a mounting clip and a hollow section.

According to the preferred embodiment, the device is produced from an endless section which is constructed in a U-shape in cross-section and has two opposing shanks which are connected at least by two cross-pieces, one cross-piece of which defines the tear-open section and the other cross-piece defines the mounting section. The holding section is an end section of an extra long shank which is hook shaped in cross-section.

The invention relates in particular to a gas bag covering in the form of a roof- or column lining of the vehicle, behind which a side gas bag is situated.

DETAILED DESCRIPTION OF PREFERRED EMBODIMENTS

Figure 1:
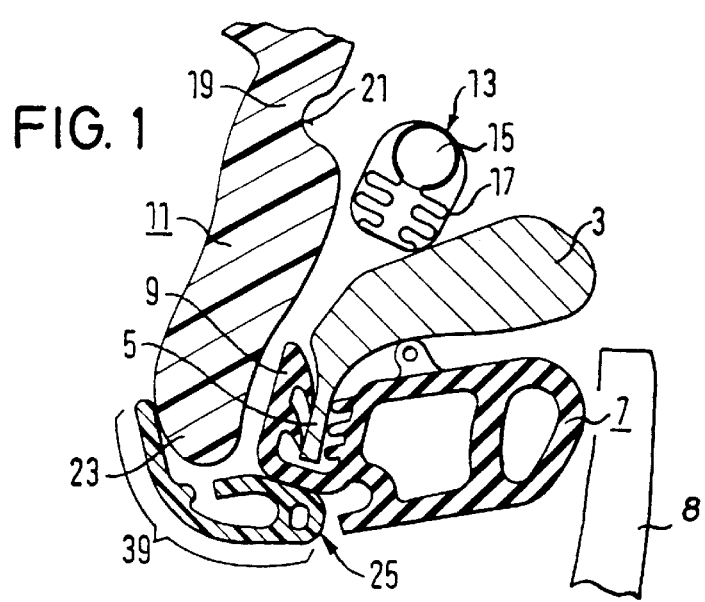
FIG. 1 shows a development of the gas bag covering system according to the invention in the form of a roof lining together with a device, fastened to the door seal to detachably fasten the gas bag covering, in cross-sectional view.
Figure 2:
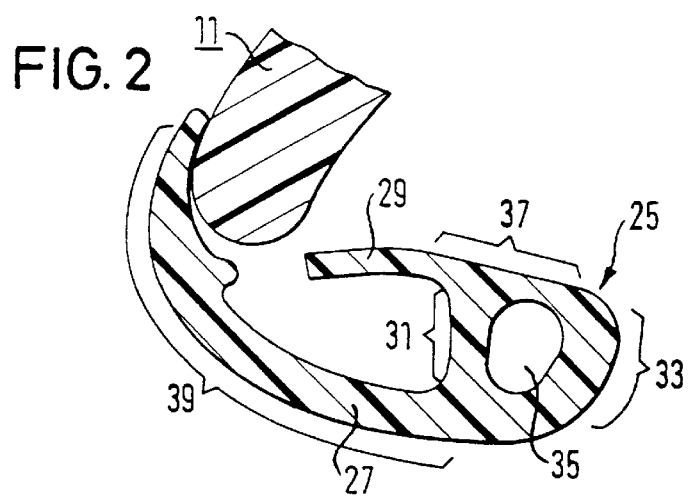
FIG. 2 shows an enlarged view of the gas bag covering system, i.e. the covering together with the fastening device shown in FIG. 1.

In FIG. 1 a section through a vehicle in the region of a roof frame or a vehicle column (A, B or C column) is illustrated in a stylized manner. The roof frame or the A column itself is illustrated in greatly simplified form and is given the reference number 3. An extension 5 of the roof frame serves inter alia for fastening the seal 7, formed from an endless section, for the vehicle door or a side window 8. For this, the seal 7 has a U-shaped mounting section 9 which is provided with inwardly projecting, hook-shaped cross-pieces, which serve for holding the seal 7 on the extension 5 so as to be secure in its position. A gas bag covering in the form of a section of a roof lining, also designated as canopy, is represented by 11. Between the roof frame 3 and the gas bag covering 11, a head/side gas bag module 13 is arranged (likewise illustrated in highly stylized form), which has a gas guiding duct 15 and a head/side gas bag 17. The gas bag covering 11 is formed by a flap-like lateral section of the roof lining, which in turn is delimited by a type of film hinge 19, the film hinge being formed by an indentation 21 in the roof lining. The gas bag covering 11 has a lower edge 23 which is pressed against the roof frame 3 by a device 25 for detachably fastening the gas bag covering 11 in the region of this edge. The device 25, which is illustrated in further detail in FIG. 2, is likewise manufactured from an endless section of rubber or plastic and is glued onto the seal 7 or applied thereto by extruding. The covering and the device form a gas bag covering system and the portion of the covering adjacent the edge covers an unfolding opening 51 (see FIG. 4) in the vehicle via which the gas bag unfolds.

The device 25 for detachably fastening the gas bag covering 11 has a section, U-shaped in cross-section, with two shanks 27, 29 lying opposite each other, only the shank 27 being visible from the outside. The two shanks 27 and 29 are connected with each other by two cross-pieces, namely a cross-piece close to the gas bag covering 11 and designated as tear-open section 31, as well as by a cross-piece situated at a distance therefrom and designated as mounting section 33. A cavity 35 is formed between the cross-pieces. The shank 29 has a fastening section 37, in the region of which the device 25 is glued onto the seal 7 or applied thereto by extruding. The shank 27 is constructed distinctly longer than the shank 29 and has a hook-shaped end section which is designated as holding section 39. This holding section 39 is formed such that it, and hence the device 25, embraces the edge 23, thereby engages it and presses it against the roof frame 3 or the seal 7.

Figure 3:
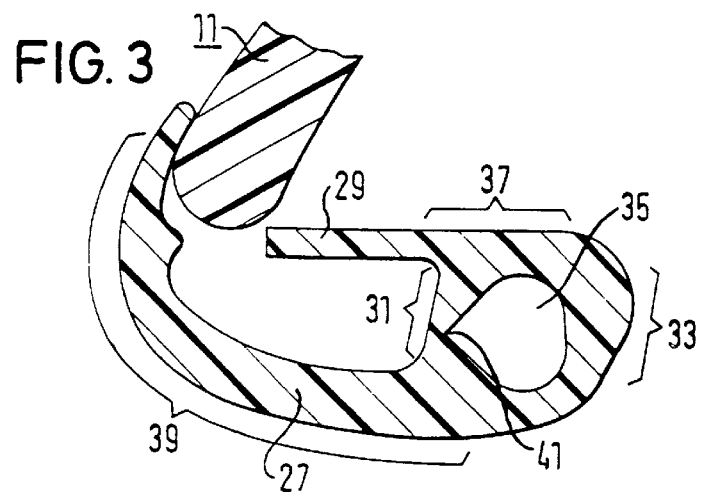
FIG. 3 shows a cross-sectional view, corresponding to FIG. 2, through a gas bag covering system according to the invention, together with a slightly modified fastening device as compared with FIG. 2.

The embodiment of the gas bag covering illustrated in FIG. 3 largely corresponds to that shown in FIG. 2. The single difference is that the tear-open section 31 is provided with a material weakening which defines a tear-open line 41.

However, not only does a tear-open section have to be provided, but the two shanks 27 or 29 can also be connected with each other by further cross-pieces, for example by a cross-piece which originates from the free, outer edge of the shank 29. Furthermore, the tear-open line 41 does not have to run over the entire length of the mounting clip-like fastening device 25, but rather it can also only extend in sections in longitudinal direction.

The device 25 holds the lower edge 23 of the gas bag covering 11 so as to be secure in position in the normal traveling operation. However, as soon as the gas bag 17 has to be unfolded and presses downwards between the gas bag covering 11 and the roof frame 3, the gas bag covering 11 endeavors to swivel up in a clockwise direction outwards around the film hinge 19. Thereby, a gas bag unfolding opening 51 in the vehicle via which the gas bag unfolds and which is covered by the shown portion of the cover is exposed which is to be seen in FIG. 4.

Figure 4:
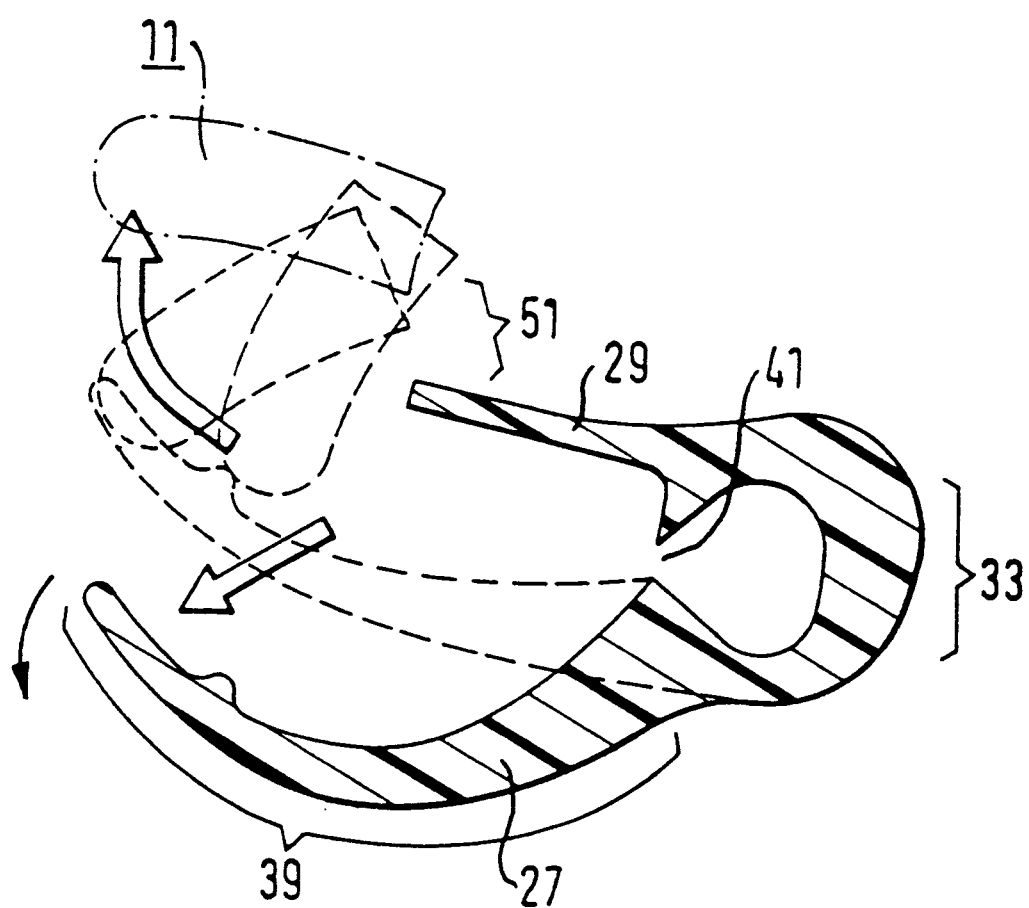
FIG. 4 shows the gas bag covering system together with the fastening device according to FIG. 3 when the gas bag unfolding opening is exposed.

In FIG. 4, the process of opening or exposing the gas bag unfolding opening is illustrated. Through the force of the unfolding gas bag 17, acting to the left laterally in FIG. 4, the holding section 39 is pressed outwards and, owing to its incline, is also pressed downwards, because the covering 11 endeavors to detach itself from its mounting. Thereby, a tensile force is exerted via the holding section 39 and the shank 27 onto the tear-open section 31, which force leads to the destruction of this cross-piece which is designated as tear-open section 31. This is illustrated in FIG. 4. Only the mounting section 33 still then connects the two shanks 27 and 29 with each other. In the embodiment according to FIG. 1, also without a tear-open line 41, the tear-open section 31 is likewise destroyed when the shank 27 is swung downwards.

The mounting section 33 has several functions. Firstly, it serves as swivel bearing on further opening of the gas bag covering 11, after the destruction of the tear-open section 31. Furthermore, it prevents the holding section 39 from being able to fly into the interior of the vehicle as a loose part with the entire shank 27 during opening. Through the fact that the tear-open section 31 is destroyed at the start of the opening process, the device 25 offers a very slight resistance to the further swiveling of the shank 27 together with the holding section 39 downwards in the arrow direction. The resistance is principally only defined by the bending resistance in the region of the mounting section 33. Individual positions of the gas bag covering 11 during swiveling are illustrated by broken lines in FIG. 4, just as the directions of movement of gas bag covering 11 and holding section 39, which are illustrated by arrows. After the swiveling up of the gas bag covering 11, the head/side gas bag 17 passes through the gas bag unfolding opening 51 and extends in front of a vehicle window.

The gas bag covering shown, together with its device for detachable fastening, is excellently suited in particular to so-called ABC gas bags, which in the case of a lateral impact cover the side windows of the vehicle in a manner similar to a curtain.

However, the device shown is not only suitable for fastening the lining of the vehicle roof, but also for example for other interior linings, for example that of a vehicle column.

What is claimed is:

1. A gas bag covering system comprising a gas bag covering for covering an unfolding opening in a vehicle and a device for detachably fastening at least one part of said gas bag covering to said vehicle, said device having at least one holding section and said gas bag covering having a portion which covers said gas bag unfolding opening and which has an edge on which said holding section engages, said device being so flexible that said gas bag covering can move out from its mounting formed by said holding section when said gas bag unfolding opening is exposed, said device having a tear-open section and a mounting section, said tear-open section being destroyed on exposure of said gas bag unfolding opening and on displacement of said holding section such that the flexibility of said device being increased, and said holding section remaining secured to said device by said mounting section after destruction of the tear-open section.

2. The gas bag covering system according to claim 1, wherein said tear-open section has a tear-open line formed by material weakening.

3. The gas bag covering system according to claim 1, wherein said holding section is a lip running along said edge which is to be held.

4. The gas bag covering system according to claim 3, wherein said device has a shape like a mounting strip, and a hollow section.

5. The gas bag covering system according to claim 1, wherein said device has a fastening section on which it is mounted so as to be fixed to said vehicle.

6. The gas bag covering system according to claim 5, wherein said tear-open section is constructed as a connecting cross-piece between said fastening section and said holding section.

7. The gas bag covering according to claim 1, wherein said mounting section is deformed elastically after destruction of said tear-open section such that a swiveling of said holding section is permitted.

8. The gas bag covering system according to claim 1, wherein said device is fastened to one of a seal of a door and of a window of said vehicle.

9. The gas bag covering system according to claim 8, wherein said fastening of said device to said seal takes place by bonding or extruding.

10. The gas bag covering system according to claim 1, wherein said device has a U-section in cross-section and said holding section is a hook-shaped end section of an extra long shank of said section and said tear-open section is a cross-piece connecting the shanks.

11. The gas bag covering system according to claim 10, wherein said mounting section is a cross-piece connecting said shanks.

12. The gas bag covering system according to claim 1, wherein said gas bag covering is one of a roof lining and a column lining of said vehicle, behind which a side gas bag is situated.

* * * * *